May 2, 1961  G. O. FREDRICKSON  2,982,872
ELECTRIC MOTOR
Filed Jan. 4, 1957  2 Sheets-Sheet 2

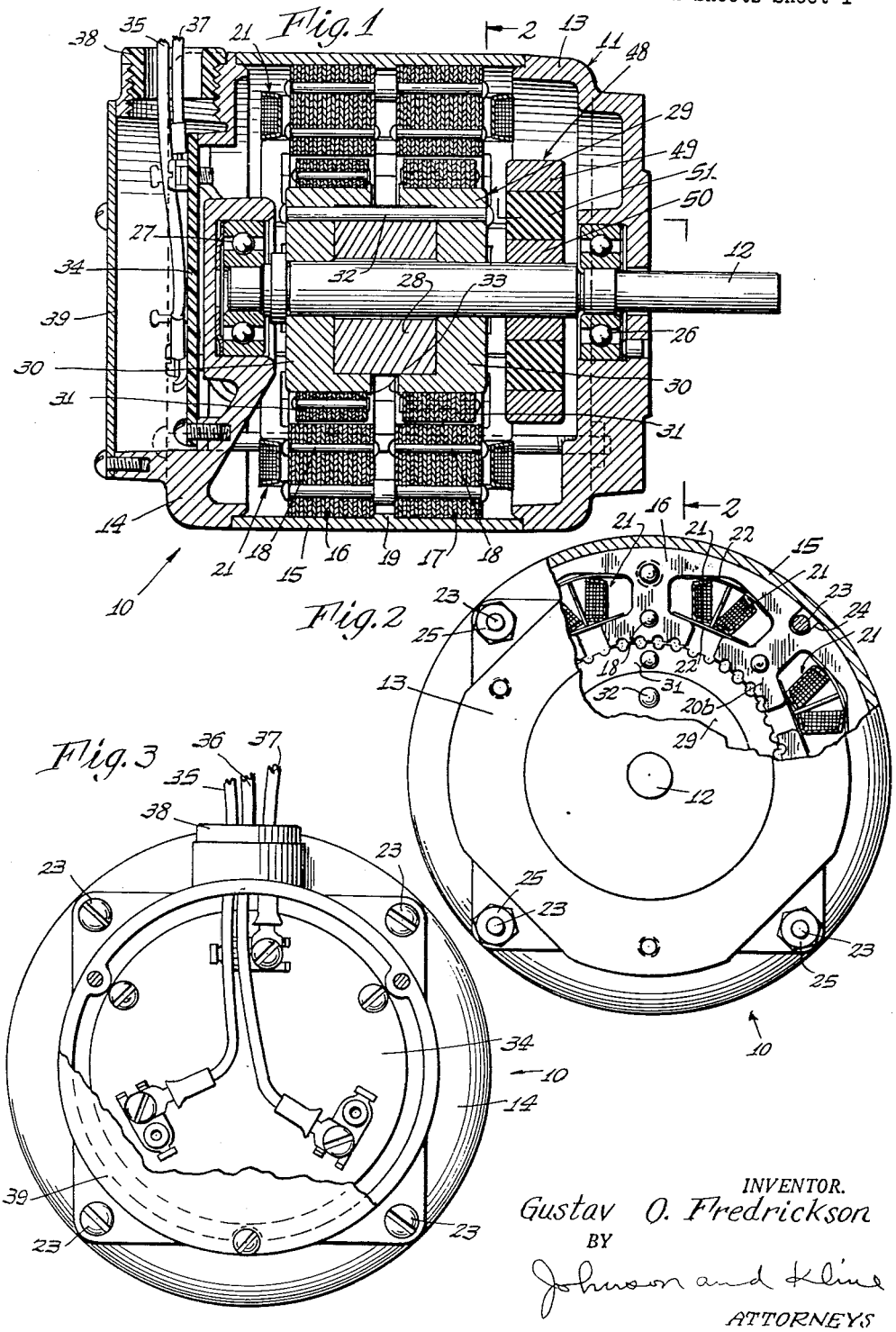

INVENTOR.
Gustave O. Fredrickson
BY
Johnson and Kline
ATTORNEYS

United States Patent Office 2,982,872
Patented May 2, 1961

2,982,872

ELECTRIC MOTOR

Gustav O. Fredrickson, Southington, Conn., assignor to The Superior Electric Co., Bristol, Conn., a corporation of Connecticut Filed Jan. 4, 1957, Ser. No. 632,567

1 Claim. (Cl. 310—163)

The present invention relates to synchronous inductor electric motors.

In motors of the present type, rotation is caused by a unidirectional magnetic field being attracted to and following a rotating magnetic field. The unidirectional field in the embodiment illustrated is produced by a permanent magnet forming a part of the rotor or rotating element of the motor. The stator or stationary element of the motor has an even number of magnetic poles and a two phase winding with alternate poles being energized by the same phase. When the windings are connected to a source of alternating current, during one-half of the cycle of alternating current, each of the poles will have a magnetic polarity and on the other half of the cycle they will have the opposite polarity. Thus in the poles energized by one phase of the winding, one pole will for example be north, the next one south, the next north, during one-half of the cycle and in the other cycle they become south, north, south, etc. The poles energized by the other phase of the winding will have a similar magnetic polarity only it is about 90° out of phase with the first set of poles. Accordingly, rotation is produced by the unidirectional field being first attracted and then repelled by the change in the polarity in the poles. The rotating speed of the motor using a constant cycle alternating source is varied by mechanical construction features such as the number of poles of the stator and the configuration of the rotor and stator poles.

It is an object of the present invention to provide in a motor of the above type for a higher starting torque than heretofore possible in similar sized units.

A further object of the present invention is to provide for a more constant pull or torque on the rotor by the stator poles and the production of more power than in prior motors having similar operation.

Another object of the present invention is the provision in an electric motor of the type above referred to of quieter operation especially at light loads than heretofore previously accomplished.

In carrying out the above objects, a feature of the invention is the forming of inner periphery of the stator poles with projections or teeth and in which each of the teeth has the same pitch, so that each tooth is the same size and spaced the same distance from its adjacent tooth. Similarly, the rotor is provided with teeth having the same pitch with the pitch of the rotor teeth being different from the stator. The difference is primarily caused by the number of teeth of the rotor being different than the number of teeth which may be formed on the circumference of a circle on which the inner periphery of the stator poles lie. In the embodiment of the invention illustrated herein the rotor has more teeth than that which the stator may have.

A further feature of the invention resides in dampening means in the form of a flywheel which is secured to the rotor shaft and has an intermediate resilient portion to decrease the vibration caused by the pulsating movement of the rotor and to smooth out the output torque of the motor.

Other features and advantages will hereinafter appear.

In the accompanying drawing:

Figure 1 is a section of the motor of the present invention taken along the axis of the shaft.

Fig. 2 is an end view thereof taken on the line 2—2 of Fig. 1.

Fig. 3 is a view, partly in section, of the other end of the motor.

Figure 4:
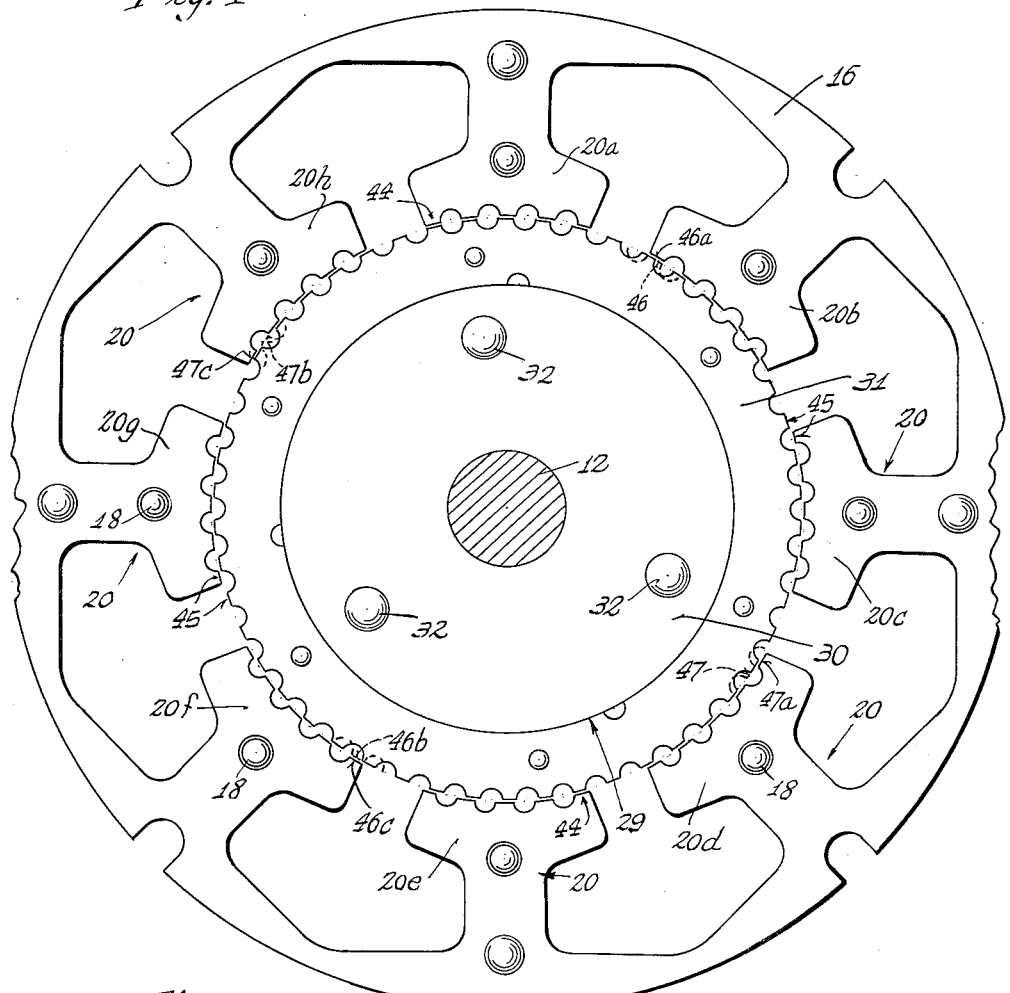
Fig. 4 is an enlarged radial section with details omitted to show the configuration of the rotor and stator.

Referring to the drawing, the motor of the instant invention is generally indicated by the reference numeral 10 and consists of a frame 11 and a shaft 12. The frame 11 is substantially cylindrical in shape and includes a shaft end bell 13 and a terminal end bell 14. These two bells are preferably formed of non-magnetic cast material such as aluminum. A stator shell or ring 15 of magnetic material is interposed between the two bells 13 and 14. Press fitted into the interior of the shell 15 are stator armatures 16 and 17. These armatures are preferably formed of laminated magnetic material and have pins 18 for securing the laminations together. Intermediate the interior surface of the shell 15, a ridge 19 is formed against which the stator armatures 16 and 17 are pushed in order to have the armatures spaced a predetermined distance apart and to make them concentric with the ring. The stator armatures as shown in Figs. 2 and 4, are shaped to provide poles 20 extending radially inward with the inner surface of the poles being arcuate with the center of the arc coinciding with the axis of the frame and shaft. Windings 21 which are preferably substantially rectangular in cross-section and in plan, encircle the poles 20, with one winding for each pole. The slots between the poles enable the windings to be preformed and then inserted through the slots to encircle the poles. Insulation 22 is provided between the windings 20 and the armatures 16 and 17. To secure the end bells 13 and 14 and the stator ring 15 together, four screws 23 are provided which pass through apertures in the end caps and through cutouts 24 formed in the stator armatures. Nuts 25 are fastened on the threaded portions thereof.

Ball bearings 26 and 27 are positioned in the end bells 13 and 14 respectively with the shaft 12 extending therein. The shaft 12 between the two ball bearings has an annular permanent magnet 28 fixed thereon with one pole of the magnet being at the end thereof near one ball bearing and the other pole being at the other end near the other ball bearing. Fastened onto the shaft and positioned against the ends of the magnet 28 are rotor pole pieces indicated by the reference numeral 29. While the pole pieces may be a part of the magnet, in the embodiment shown they are distinct and each includes a pole cap 30 and an armature 31. Pins 32 hold the pole pieces together against the end surfaces of the magnet 28. The armatures 31 are each force fitted onto their respective caps 30. Each of these armatures are preferably formed of laminated magnetic material held together by pins and they are forced onto the pole caps 30 until they abut locating rings or ridges 33 on each of the pole caps.

Mounted on the terminal end bell 14 is a terminal board 34, formed of insulating material, to which exterior wires 35, 36 and 37 are connected and to which the ends of the windings are connected. The wires 35, 36 and 37 extend out through an insulating bushing 38 while a plate 39, which may be a name plate, is spaced from the terminal board yet provides for access thereto.

Figure 5:
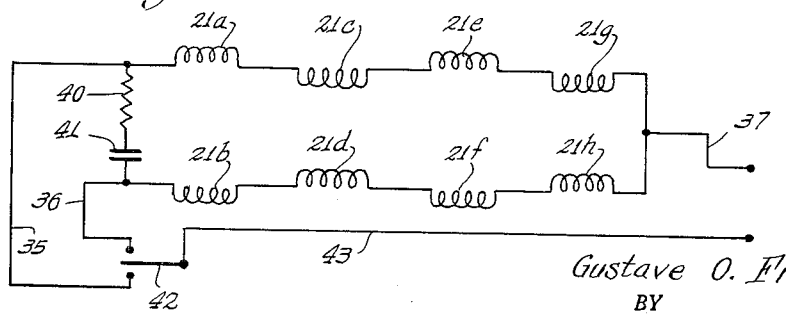
Fig. 5 is a schematic diagram of the electrical elements.

As shown in Fig. 5, the windings are designated as 21a through 21h, there being one winding for each pole of the stator and accordingly, there are eight windings. Four of the windings are connected in series in one line and paralleling the line is another line having the other four windings connected in series. In order to make the phase of one line substantially 90° out of phase with the other, a resistance 40 and condenser 41 are connected between the lines in the embodiment illustrated though other phase shifting components may be utilized if desired. Also provided is a double pole single throw switch 42 by which the direction of rotation of the motor may be reversed. A lead 43 is connected to the switch 42 and the lead 37 connects to the windings and these two leads are adapted to be connected to a source of alternating current. The leads 35 and 36 connect to each line of the windings and a side of the switch 42. The resistance 40 and condenser 41 are only shown schematically and may either be positioned outside the motor or inside between the terminal board and the plate 39.

The stator is formed to have eight poles, 20a through 20h noted alphabetically clockwise, with the winding having the same letter encircling the pole for inducing the magnetic flux in the pole. The inner periphery of the poles are arcuate and lie on the circumference of a circle with the center thereof aligned with the axis of the shaft. In the instant embodiment it is desired to have 48 teeth which are equally dimensioned and equally spaced about the periphery and thus each tooth has the same pitch. Accordingly, each of the eight poles has five teeth which total 40 and the remaining eight are theoretically positioned in the slots between the poles. Thus each pole is identical and the distance between poles is one pitch plus one space. However, if the number of teeth of the stator is not divisible evenly by the number of poles or the slot size is varied the inner periphery of the poles would not be exactly the same.

The rotor is formed to have fifty teeth with each tooth having the same pitch and thus the teeth are evenly spaced about the periphery and have equal dimensions.

The ratio of 48 to 50 is double a prime ratio of teeth, namely 24 to 25. For each prime ratio there will be only one tooth of the rotor exactly radially aligned with one tooth of the stator. In the instant embodiment since the prime ratio is doubled, there are two teeth of the rotor and two of the stator which are aligned. The aligned teeth are diametrically opposite each other and the teeth of the rotor and stator therebetween are vernially aligned to being exactly out of line at a point half-way between the aligned teeth. The two sets of aligned teeth are indicated by reference numerals 44 and the exactly out-of-line teeth by numerals 45. The number of teeth and poles shown results in a speed of 72 r.p.m. when 60 cycle A.C. is used though other prime ratios and multiples thereof may be used when a different speed is desired.

The path of magnetic flux from the permanent magnet 28 is through rotor pole piece 29, rotor armature 31, the gap between the rotor armature and the stator armature, the stator armature 16, the stator ring 15 and stator armature 17, the gap between the stator and rotor armatures, the rotor armature 31 and the rotor pole piece 29 to the opposite pole of the permanent magnet. The shaft is formed of non-magnetic material to avoid shunting the magnetic field. The rotor attempts to position itself so that there is minimum reluctance in the gap between unlike poles of the stator and the rotor. Thus referring to Fig. 5, the rotor is assumed to be magnetically south with each tooth being a south pole and by reason of the permanent magnet maintains this polarity. Instantaneously, the alternating current will cause the poles 20a and 20e to be north, the poles 20c and 20g to be south, and the poles 20b, 20d, 20f and 20h to be magnetically neutral by reason of the 90° phase relationship. Accordingly the teeth of the rotor will attempt to become radially aligned with the teeth of the N poles and exactly out of line with the teeth of the S poles. Thus the matching teeth 44 are exactly aligned and the teeth adjacent thereto are as aligned as possible to the poles 20a and 20e while the teeth 45 and their adjacent teeth are as far out of line as possible with the teeth of the poles 20c and 20g. The current then moves 90° which causes N poles 20b and 20f, S poles 20d and 20h and neutral poles 20a, 20c, 20e and 20 g.

The rotor moves ¼ of a tooth pitch so that there is one tooth 46 shown in dotted lines of the rotor in alignment with one tooth 46a of the pole 20b. Diametrically opposite the pole 20f similar teeth 46b and 46c are aligned. While at the poles 20d and 20h, there is one tooth of each pole, indicated by the reference numeral 47a and 47c respectively and two rotor teeth 47 and 47b exactly out of alignment. When the current moves another 90° the poles 20c and 20g become N poles. The poles 20e and 20a become S poles and the other four poles are magnetically neutral. This causes the rotor to move ¼ of a tooth pitch so that there is one tooth aligned at the poles 20c and 20g and one tooth exactly out of alignment at the poles 20e and 20a. Thus the rotor is made to follow the magnetically changing polarity of the poles.

The windings, therefore, at one instant cause alternate poles i.e., 20a, 20c and 20e and 20g to have induced alternately opposite magnetic polarity i.e., 20a and 20e are N and 20c and 20g are S, while ninety degrees later alternate intermediate poles i.e., 20b, 20d, 20f and 20h have induced alternately opposite magnetic polarity i.e., the poles 20b and 20f become N poles and 20d and 20h become S poles. The particular polarity of the poles as set forth above causes the rotor to revolve in a clockwise direction. If the polarity were reversed, such as if the pole 20b becomes an S pole, then the rotor would revolve in a counterclockwise direction. Also reverse rotation may be obtained by the rotor having less teeth than the stator may have about the stator circle.

Since the rotor pieces 29 are north and south poles, the rotor pole pieces 29 are mounted so as to be ½ a tooth pitch out of axial alignment while stator teeth are in alignment.

The above operation of the device produces pulsations and to provide a substantially even output torque there is provided dampening means 48 which also decreases vibration and noise of the motor. This dampening means in the instant embodiment consists of a flywheel having inner and outer rigid portions which may be rings 49 and 50 respectively and an intermediate resilient ring 51 which may be made from rubber. The inner ring 49 is fastened securely to the shaft 12 and the rings 49, 50 and 51 are adhesively secured together.

In the foregoing, there has been set forth a synchronous inductor electric motor in which the stator includes poles which have teeth with each tooth having the same pitch. The rotor is formed to have teeth with each of its teeth having the same pitch with the two diametric pitches being different. This difference is primarily caused by there being less teeth about the circle of the rotor or stator than about the other and as shown in the illustrated embodiment the rotor teeth have more teeth than the stator may theoretically have. Thus dividing the rotor circumference by the number of rotor teeth and the stator circle by the number of teeth desired in the stator produces the pitch of each. In addition, the normal step by step operation of the rotor is reduced to a substantially constant torque by dampening means which still further smooths out the pulsating movement of the rotor and minimizes noise and vibration.

Variations and modifications may be made within the scope of the claim and portions of the improvements may be used without others.

I claim:

An electric motor comprising a cylindrical frame; stator means in said frame including a pair of axially spaced annular rings, each ring having an even number of substantially evenly spaced inwardly radially projecting poles with the inner periphery of the poles lying on the circumference of a circle having a center on the axis of the frame, and means connectible to a source of alternating current for causing at one instant alternate poles to have induced alternately opposite magnetic polarity and then ninety (90) electrical degrees later the intermediate poles to have induced alternately opposite magnetic polarity; and a rotor mounted in the frame including a shaft, a pair of axially spaced annular pole pieces mounted on the shaft and radially aligned with the stator poles, permanent magnet means for causing one pole piece to have one magnetic polarity and the other pole piece, the opposite magnetic polarity; the periphery of the rotor pole pieces being formed with teeth having the same pitch and the inner surface of the stator poles being formed with teeth having the same pitch, with the pitches of the rotor and stator teeth being different, in which the number of teeth on the rotor pole pieces and the number of teeth which may be formed on the stator poles bear a prime ratio to each other and in which there is only one tooth of the stator and rotor aligned at a time per prime ratio of teeth.

References Cited in the file of this patent

UNITED STATES PATENTS

| | | |
|---|---|---|
| 2,105,514 | Welch | Jan. 18, 1938 |
| 2,589,999 | Feiertag et al. | Mar. 18, 1952 |

FOREIGN PATENTS

| | | |
|---|---|---|
| 400,957 | Great Britain | Nov. 2, 1933 |
| 483,913 | Great Britain | Apr. 22, 1938 |
| 701,106 | France | Jan. 5, 1931 |